US009287916B2

(12) United States Patent (10) Patent No.: US 9,287,916 B2
Wicks et al. (45) Date of Patent: Mar. 15, 2016

(54) REMOVABLE SCREEN PROTECTOR

(71) Applicant: OTTER PRODUCTS, LLC, Fort Collins, CO (US)

(72) Inventors: Jeffrey C. Wicks, Fort Collins, CO (US); Carlton R. Lay, Fort Collins, CO (US); William L. DeMarco, Fort Collins, CO (US); James M. Hendrix, Fort Collins, CO (US); Jamie L. Johnson, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 0 days.

(21) Appl. No.: 13/891,950

(22) Filed: May 10, 2013

(65) Prior Publication Data

US 2014/0332417 A1 Nov. 13, 2014

(51) Int. Cl.
*B65D 85/00* (2006.01)
*H04B 1/3888* (2015.01)

(52) U.S. Cl.
CPC .................................. *H04B 1/3888* (2013.01)

(58) Field of Classification Search
CPC ............................ H04B 1/3888; H05K 5/0086
USPC .................................... 206/320, 701, 305, 37
See application file for complete search history.

(56) References Cited

U.S. PATENT DOCUMENTS

| 5,132,588 | A | 7/1992 | Warman |
| 5,175,873 | A | 12/1992 | Goldenberg et al. |
| 5,368,159 | A | 11/1994 | Doria |
| 5,388,691 | A | 2/1995 | White |
| 5,661,578 | A * | 8/1997 | Habing et al. .................. 349/65 |
| 5,990,874 | A | 11/1999 | Tsumura et al. |
| 6,094,785 | A | 8/2000 | Montgomery et al. |
| 6,215,474 | B1 | 4/2001 | Shah |
| 6,317,313 | B1 | 11/2001 | Mosgrove et al. |
| 6,349,824 | B1 | 2/2002 | Yamada |
| 6,375,009 | B1 | 4/2002 | Lee |
| 6,646,864 | B2 | 11/2003 | Richardson |
| 7,029,055 | B2 * | 4/2006 | Bourque et al. ......... 296/146.16 |
| 7,050,841 | B1 | 5/2006 | Onda |
| 7,054,441 | B2 | 5/2006 | Pletikosa |
| D526,780 | S | 8/2006 | Richardson et al. |
| 7,158,376 | B2 | 1/2007 | Richardson et al. |
| 7,180,735 | B2 | 2/2007 | Thomas et al. |

(Continued)

FOREIGN PATENT DOCUMENTS

EP 1939263 A1 7/2008

OTHER PUBLICATIONS

International Search Report and Written Opinion of the International Searching Authority, International Application No. PCT/US2014/036748, mailed Sep. 8, 2014.

*Primary Examiner* — Anthony Stashick
*Assistant Examiner* — James M Van Buskirk

(57) ABSTRACT

A protective case can include a removable screen protector that is reusable and easily interchangeable by hand. In one example, the protective case can be part of a kit that includes a plurality of removable screen protectors, and the removable screen protectors can each have special attributes that allow a user to quickly and easily modify the attributes of the protective case by simply exchanging a first removable screen protector with a second removable screen protector. In this way, the user can quickly and easily modify the attributes of the protective case to better align with practical considerations of the user's environment.

19 Claims, 15 Drawing Sheets

(56) References Cited

U.S. PATENT DOCUMENTS

| | | |
|---|---|---|
| 7,194,086 B2 | 3/2007 | Pletikosa |
| D542,524 S | 5/2007 | Richardson et al. |
| 7,255,228 B2 | 8/2007 | Kim |
| 7,343,184 B2 | 3/2008 | Rostami |
| 7,389,869 B2 | 6/2008 | Mason, Jr. |
| D581,421 S | 11/2008 | Richardson et al. |
| 7,495,895 B2 * | 2/2009 | Carnevali ................ 361/679.26 |
| D603,602 S | 11/2009 | Richardson et al. |
| 7,907,394 B2 | 3/2011 | Richardson et al. |
| 8,256,612 B1 * | 9/2012 | Wang ........................... 206/320 |
| 8,395,894 B2 * | 3/2013 | Richardson et al. ..... 361/679.55 |
| 2001/0040109 A1 | 11/2001 | Yaski et al. |
| 2002/0195910 A1 | 12/2002 | Hus et al. |
| 2006/0169607 A1 | 8/2006 | Carnevali |
| 2010/0302716 A1 | 12/2010 | Gandhi |
| 2011/0228458 A1 * | 9/2011 | Richardson et al. ..... 361/679.01 |
| 2011/0319147 A1 | 12/2011 | Tages et al. |

* cited by examiner

REMOVABLE SCREEN PROTECTOR

BACKGROUND

Personal electronic devices are commonly used for communication and entertainment purposes. Examples of these devices include smartphones, tablets, audio players, video players, cameras, portable computers, two-way radios, and GPS receivers. To protect these devices from damage resulting from everyday use, a user can install the device in a protective case. Certain protective cases include a built-in screen protector that covers a display screen of the electronic device and allows a user to interact with the display screen. Unfortunately, these products do not allow the user to quickly and easily exchange a first screen protector for a second screen protector, since removal of the built-in screen protector requires complete disassembly of the protective case. Consequently, the user cannot easily exchange a clear membrane for a privacy membrane when the user moves from a private environment, such as their home or office, to a public environment, such as an airport terminal or subway station.

Adhesive screen protectors provide an alternative to protective cases with built-in screen protectors. Adhesive screen protectors are applied directly to the display screen and, unlike built-in screen protectors, allow the user to replace a first screen protector with a second screen protector. Unfortunately, adhesive screen protectors are not reusable, so switching between a first and second screen protector requires the first screen protector to be discarded, which can be costly and wasteful. In addition, adhesive screen protectors should be applied in a clean environment to avoid introducing dust, lint, and other particles between the display screen and the screen protector. These particles create bubbles and aberrations that are undesirable since they obscure the display screen and may interfere with operation of the screen. Moreover, adhesive screen protectors require time and patience to apply properly. During installation, the user may be required to apply the adhesive screen protector and then use a squeegee device to eliminate trapped air bubbles. In view of these considerations, adhesive screen protectors are not well-suited to being rapidly installed or interchanged in outdoor environments.

BRIEF DESCRIPTIONS OF DRAWINGS

DETAILED DESCRIPTION

The solution described herein provides a protective case that includes a screen protector that is removable, reusable, and interchangeable to accommodate a wide variety of environments that a user may encounter. In one embodiment, the protective case can be part of a kit that includes a plurality of removable screen protectors, and those removable screen protectors can be stored in a wearable storage container. The removable screen protectors can each have special attributes that allow the user to quickly and easily modify attributes of the protective case by exchanging a first removable screen protector for a second removable screen protector. In this way, the user can quickly and easily modify attributes of the protective case to better align with practical considerations of the user's environment.

A protective case 100 for an electronic device can include a hard shell. In one example, shown in FIG. 4, the hard shell 405 can include a first hard shell 410 and a second hard shell 415. In other examples, the hard shell 405 can include a single component or can have more than two components that assembly to form the hard shell. The first hard shell 410 can attach to the second hard shell 415 in any suitable way, such as through interlocking features or an interference fit. The hard shell 405 can be disassembled by the user by hand to allow for removal of the electronic device from the protective case 100 when necessary. The first hard shell 410 can be configured to contact at least a portion of a front surface of the electronic device when the electronic device is installed in the protective case 100. Likewise, the second hard shell 415 can be configured to contact at least a portion of a back surface of the electronic device when the electronic device is installed in the protective case 100. In the example shown in FIG. 4, the second hard shell 415 can be configured to cover a majority of a back surface area of the electronic device, and the first hard shell 410 can be configured to cover a front perimeter surface of the electronic device. In addition to covering at least a portion of a front surface of the electronic device, the first hard shell 410 can cover at least a portion of the back surface of the electronic device, such as a rear surface of the electronic device near the bottom of the electronic device, as shown in FIG. 4.

Figure 4:
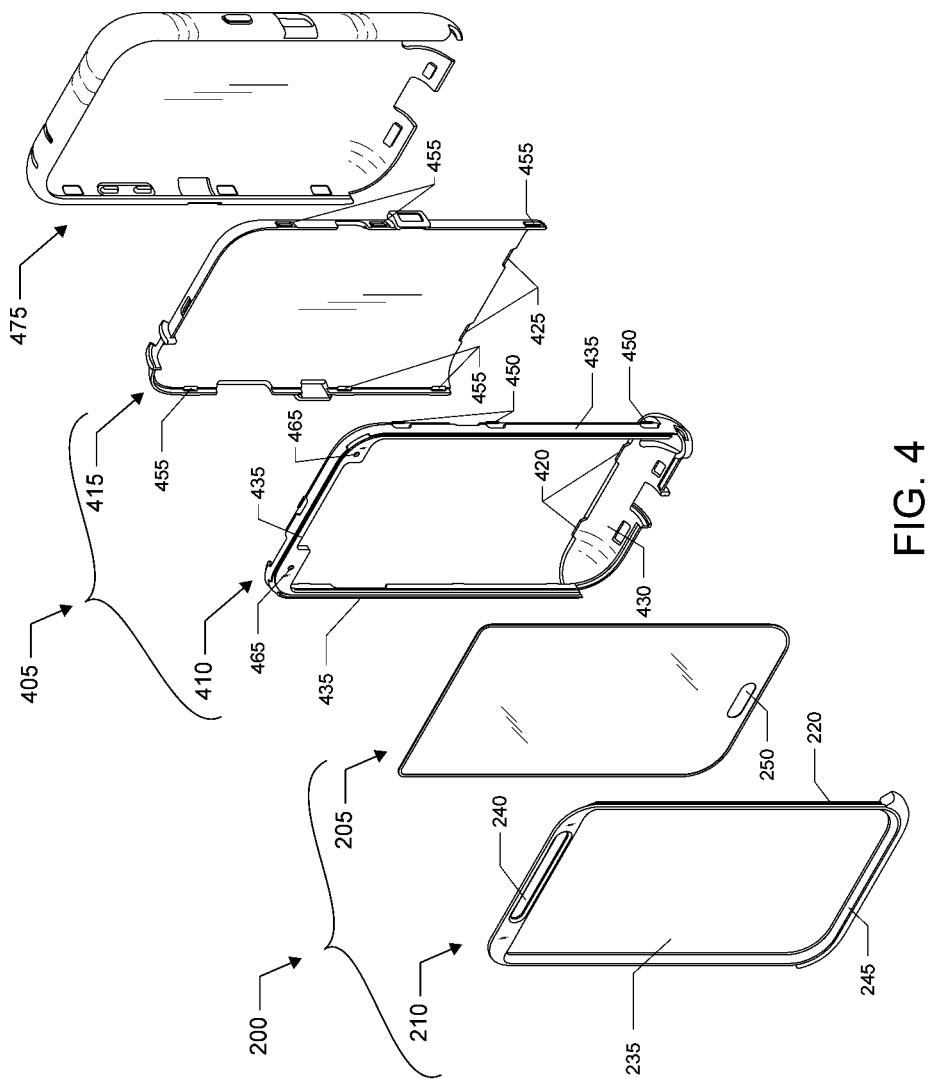
FIG. 4 is an exploded view of a protective case for an electronic device.
Figure 5:
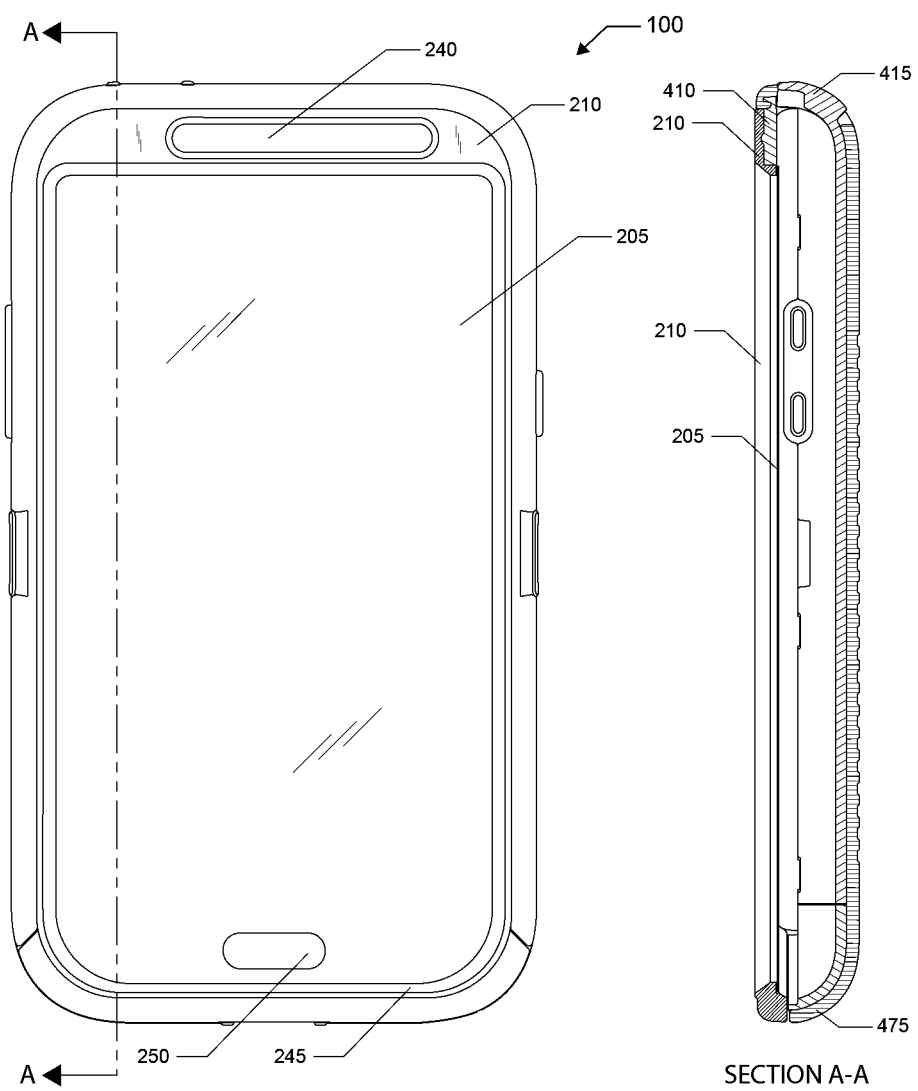
FIG. 5 is a right side view of a protective case with a removable screen protector for an electronic device, and Section A-A is a cross-sectional view of the same.

In one example, the first hard shell 410 can include a cavity 430 configured to receive at least a portion of the electronic device, such as a bottom portion of the electronic device, as shown in FIG. 4. The cavity 430 can cradle and secure the bottom portion of the electronic device and resist lateral movement of the electronic device when installed in the hard shell 405. The first hard shell 410 can include one or more tabs 420 that are configured to engage one or more tab slots 425 located in the second hard shell 415. For instance, a first tab 420 on the first hard shell 410 can be configured to engage a first tab slot 425 on the second hard shell 415. Likewise, a second tab 420 on the first hard shell 410 can be configured to engage a second tab slot 425 on the second hard shell 415. The tabs 420 and tab slots 425 can serve at least two functions. First, the tabs 420 and tab slots 425 can serve as visual alignment aids to assist the user when assembling the components of the hard shell 410. Second, the tabs 420 and tab slots 425 can serve as interlocking features that resist motion of the first hard shell 410 relative to the second hard shell 415 when the first and second hard shells are assembled to form the hard shell 405, thereby enhancing the structural integrity of the protective case 100.

The first hard shell 410 can include a perimeter portion 435 that extends around and is configured to contact at least a portion of a front perimeter edge of the electronic device, where the front perimeter edge of the electronic device is a perimeter edge extending around a front surface of the electronic device. The perimeter portion 435 can contact the electronic device on a front surface of the device adjacent to the front perimeter edge. The perimeter portion 435 can also contact the electronic device on side surfaces of the device that are adjacent to the front perimeter edge. In one example shown in FIG. 4, the perimeter portion 435 can contact the electronic device along a top side surface, a left side surface, and a right side surface, but may not contact the electronic device along a bottom side surface to provide an opening for slidably attaching a removable screen protector 200 to the first hard shell 410. Although FIG. 4 shows a first hard shell 410 that is configured to receive the removable screen protector 200 along a bottom side surface, this is not limiting. The first hard shell 410 could alternately be configured to receive the removable screen protector 200 at a top side surface, a left side surface, or a right side surface.

The protective case 100 can include a rail system that allows the removable screen protector 200 to slidably attach to the protective case 100. The removable screen protector 200 can slidably attach to the protective case 100 in any suitable way. In one example shown in FIGS. 2, 4, and Section B-B of FIG. 6, the removable screen protector 200 can include a first rail receiver 215 and a second rail receiver 220 that slidably engage a first rail 440 and a second rail 445, respectively, of the first hard shell 410 to permit attachment of the removable screen protector to the protective case 100. The first rail receiver 215 of the rail system can be disposed along a first edge of a frame 210 of the removable screen protector 200, and the second rail receiver of the rail system can be disposed along a second edge of the frame of the removable screen protector 200, where the second edge of the frame 210 is opposite the first edge of the frame.

Although the rails (440, 445) and rail receivers (215, 220) are shown along the left and right sides of the protective case 100, this is not limiting. In another embodiment, the rails (440, 445) and rail receivers (215, 220) can be positioned near the top and bottom sides of the protective case to permit insertion of the removable screen protector 200 in a direction perpendicular to and coplanar with the direction of insertion depicted in FIG. 2.

In yet another variation, the rails can be included in the removable screen protector 200, and the rail receivers can be included in the first hard shell 410. For instance, the removable screen protector 200 can include a first rail and a second rail that slidably engage a first rail receiver and a second rail receiver, respectively, located in the first hard shell 410 to permit attachment of the removable screen protector to the protective case 100. In this example, the first rail of the rail system can be disposed along a first edge of a frame 210 of the removable screen protector 200, and the second rail of the rail system can be disposed along a second edge of the frame of the removable screen protector 200.

Figure 6:
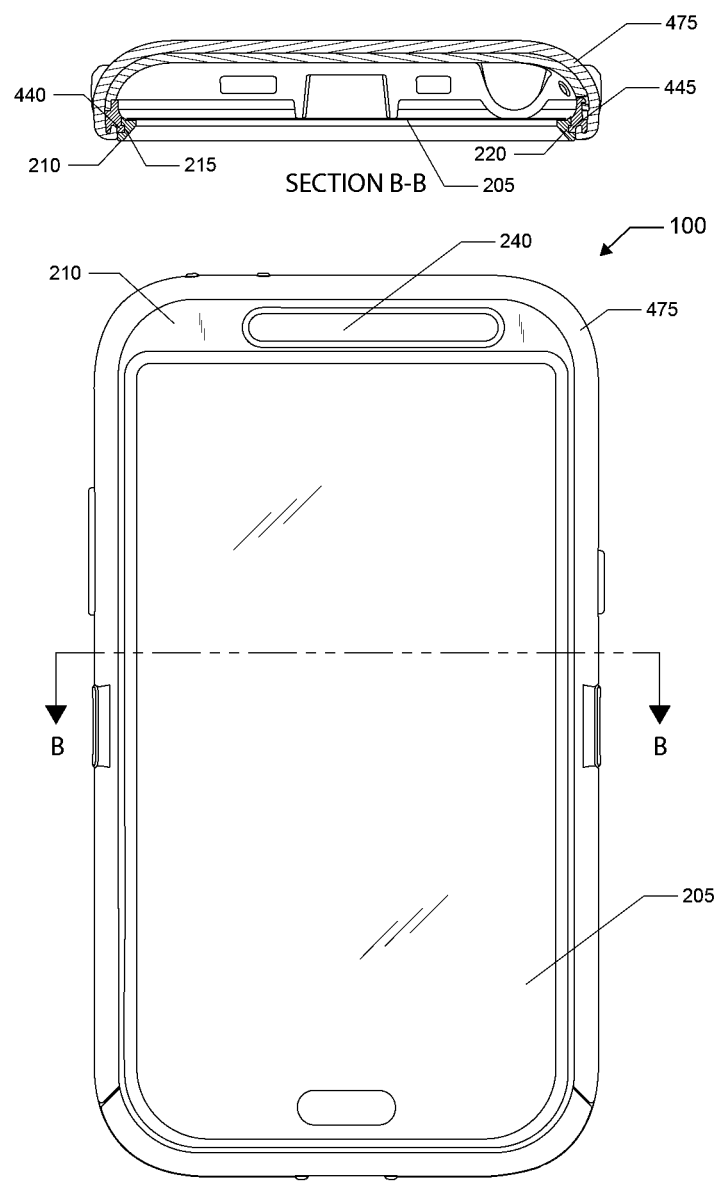
FIG. 6 is a front view of a protective case with a removable screen protector for an electronic device, and Section B-B is a cross-sectional view of the same.

As shown in Section B-B of FIG. 6, the removable screen protector 200 can slidably attach to the hard shell 405 of the protective case 100. In particular, the removable screen protector 200 can slidably attach to the first hard shell 410 of the protective case 100. In another variation, the protective case 100 may not include the first hard shell 410. Instead, the protective case may include only the second hard shell 415, also referred to as a back hard shell 415. In this variation, the back hard shell 415 may be configured to allow the removable screen protector 200 to slidably attach directly to the back hard shell 410. For example, the back hard shell 415 may extend upwardly around the sides of the electronic device and, in one instance, beyond the front surface the electronic device thereby allowing the back hard shell to slidably receive the removable screen protector 200 that is configured to cover and protect the touchscreen of the electronic device. In this example, the first and second rails can be included in the removable screen protector 200, and the first and second rail receivers, which are configured to receive the first and second rails, can be included in the back hard shell 415. In yet another example, the first and second rail receivers can be included in the removable screen protector 200, and the first and second rails can be included in the back hard shell 415

As shown in FIG. 6, the rail system, which includes the first and second rails (440, 445) and the first and second rail receivers (215, 220), can have any suitable dimensions that provide sturdy engagement between the removable screen protector 200 and the first hard shell 410 while also permitting the assembled protective case 100 to remain relatively compact. In this way, the rail system provides a practical solution for integrating a removable, reusable screen protector 200 into the protective case 100 without significantly increasing the outer dimensions of the case. In one example, the first and second rails (440, 445) can have a width of about 0.010-0.375, 0.050-0.25, or 0.050-0.125, a thickness of about 0.010-0.375, 0.050-0.25, or 0.050-0.125, and a length of about 30-120, 50-100, or 60-80% of the length of the electronic device which the protective case is configured to house. For a protective case 100 configured to house an APPLE IPHONE 5, which has a length of about 4.87 inches, the first and second rails (440, 445) can have a length of about 1.46-5.84, 2.43-4.87, or 2.92-3.89 inches. For a protective case 100 configured to house a SAMSUNG GALAXY S III, which has a length of about 5.38 inches, the first and second rails (440, 445) can have a length of about 1.61-6.46, 2.69-5.38, or 3.23-4.30 inches. For other electronic devices, including next generation versions of the above-mentioned models as well as competing models from other manufacturers, the length of the first and second rails (440, 445) can be adjusted to accommodate those devices.

As shown in the Section B-B of FIG. 6, the first and second rails (440, 445) can have a rectangular cross-sectional shape. In another example, the first and second rails (440, 445) can have any other suitable cross-sectional shape. The first and second rails (440, 445) can have a consistent cross-sectional area along the length of the rail. Alternately, to ease assembly, each rail (440, 445) can have a tapered cross-sectional area along the length of the rail. Each rail (440, 445) can have a first end and a second end opposite the first end, and the first end of the rail can be the first portion of the rail that is inserted into the rail receiver during assembly. The cross-sectional area near the first end of the rail can be less than the cross-sectional area at the second end of the rail, and the cross-sectional area of the rail between the first and second ends of the rail can be tapered. In other words, the cross-sectional area of the rail between the first and second ends of the rail can increase, and that increase can be linear, nonlinear, or stepwise. By having tapered rails, the rails (440, 445) may be easier to initially slidably engage with the rail receivers (215, 220) and may provide an interference fit when fully slidably installed. This interference fit can provide tactile feedback to the user to assure them that the removable screen protector 200 is fully slidably installed on the protective case 100.

The protective case 100 can include one or more detents 465 that are configured to locate and retain the removable screen protector 200 in relation to the hard shell 405 upon installation and in a manner such that the removable screen protector 200 can be uninstalled by applying a force to the removable screen protector in a direction opposite the direction of force applied during installation. The detents 465 can be any suitable size and shape to permit the removable screen protector 200 to be installed and uninstalled by hand. In one example, the detents 465 can be semi-spherical protrusions located on the first hard shell 410, such as on the perimeter portion 435 as show in FIG. 4. Corresponding recesses 705 that are configured to receive and retain the detents 465 upon installation can be located on the removable screen protector 200, such as on a top, back surface of the frame 210 of the screen protector, as shown in FIGS. 7 and 8.

Figure 1:
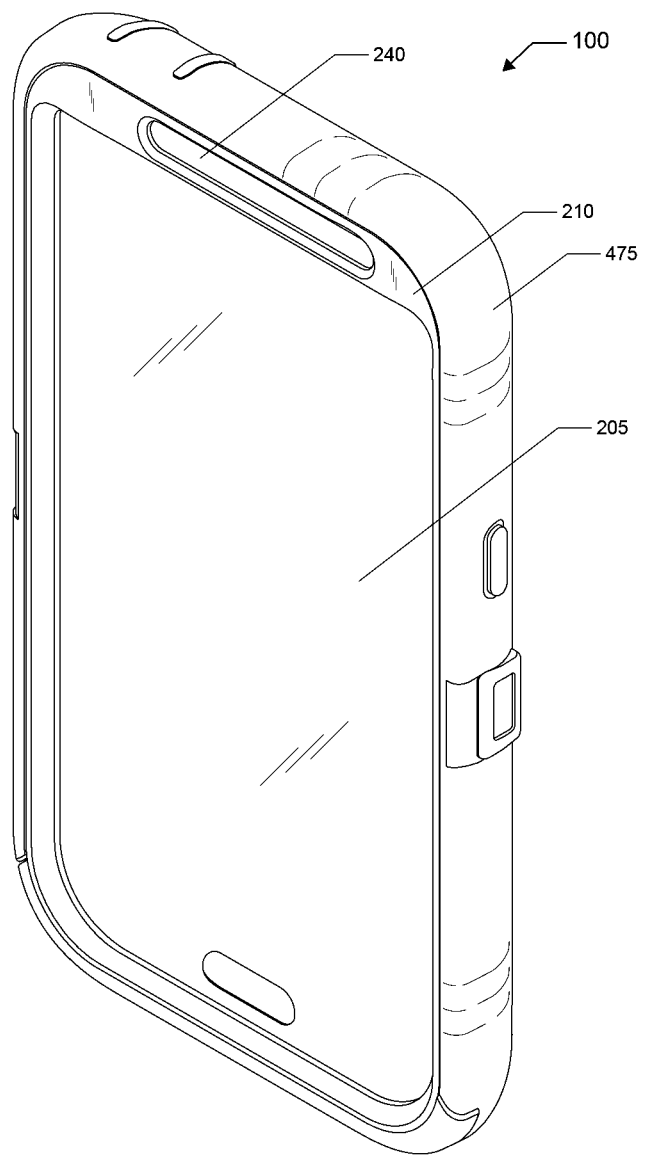
FIG. 1 is a front perspective view of a protective case with a removable screen protector for an electronic device.
Figure 2:
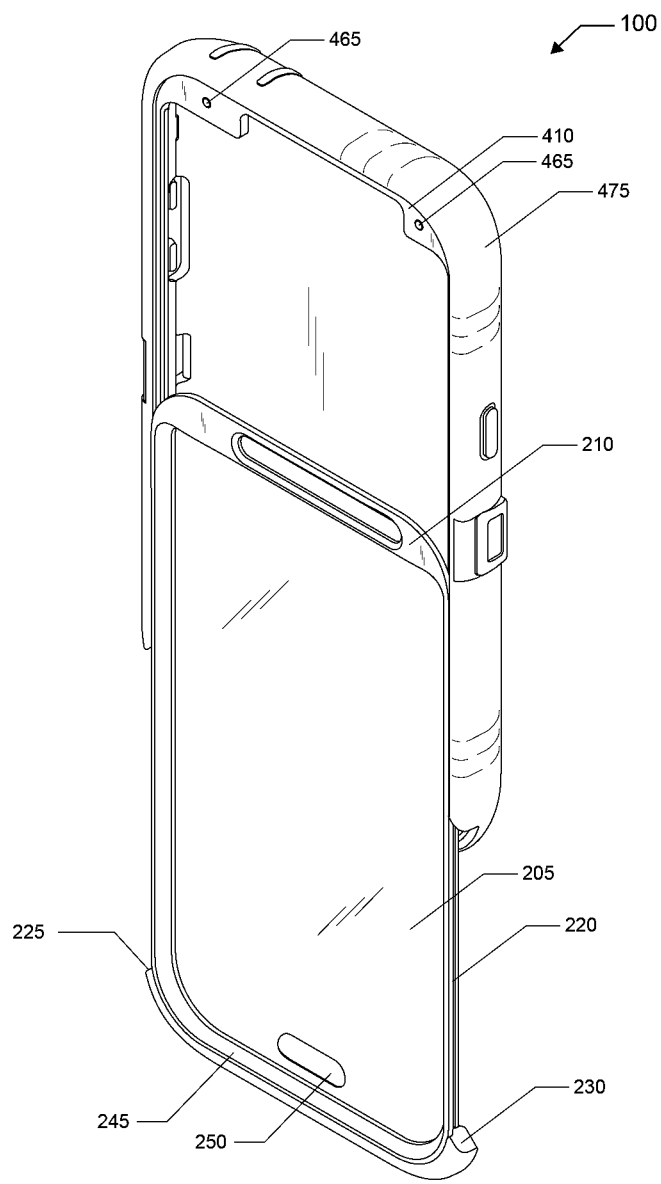
FIG. 2 is a front perspective view of a protective case for an electronic device with a removable screen protector partially installed.
Figure 3:
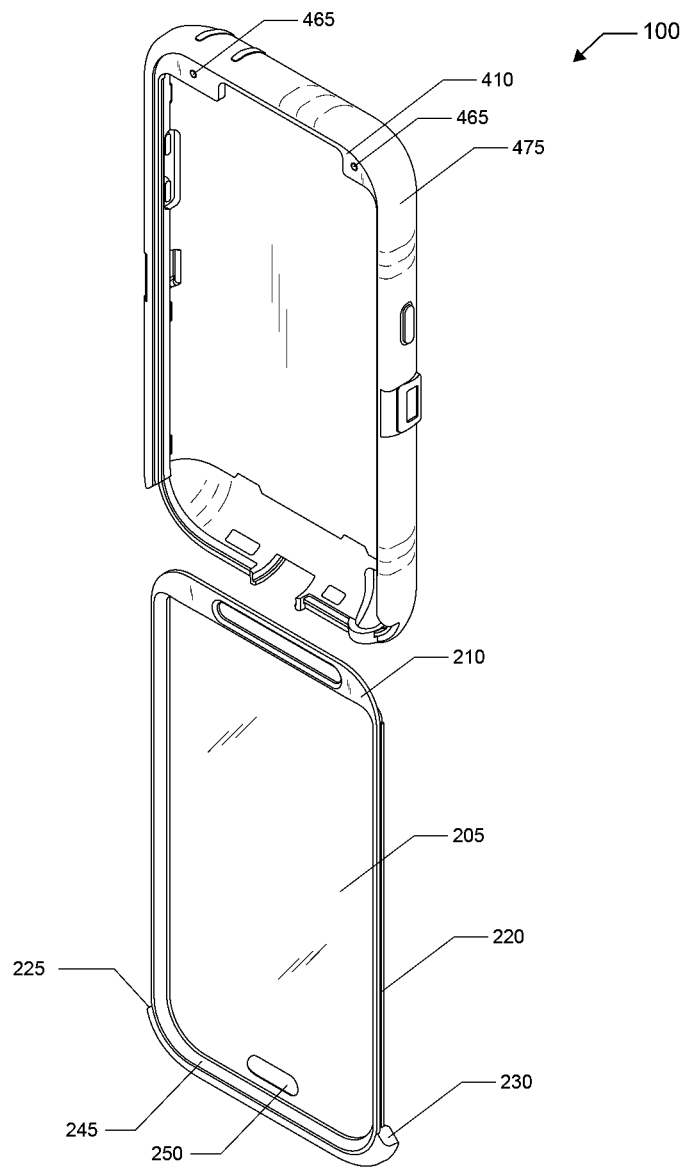
FIG. 3 is a front perspective view of a protective case for an electronic device with a removable screen protector uninstalled.

As shown in FIGS. 2 and 3, the removable screen protector 200 can include a first stop 225 and a second stop 230. The first and second stops (225, 230) can each be configured to seat against a portion of the protective case 100 upon installation of the removable screen protector 200. In one example, the first and second stops (225, 230) can be configured to seat against a portion of a cushion layer 475, as shown in FIGS. 1-3. The first and second stops (225, 230) can provide visual and tactile feedback to the user during installation and signal completion of the installation process when the first and second stops contact the cushion layer 475.

Figure 8:
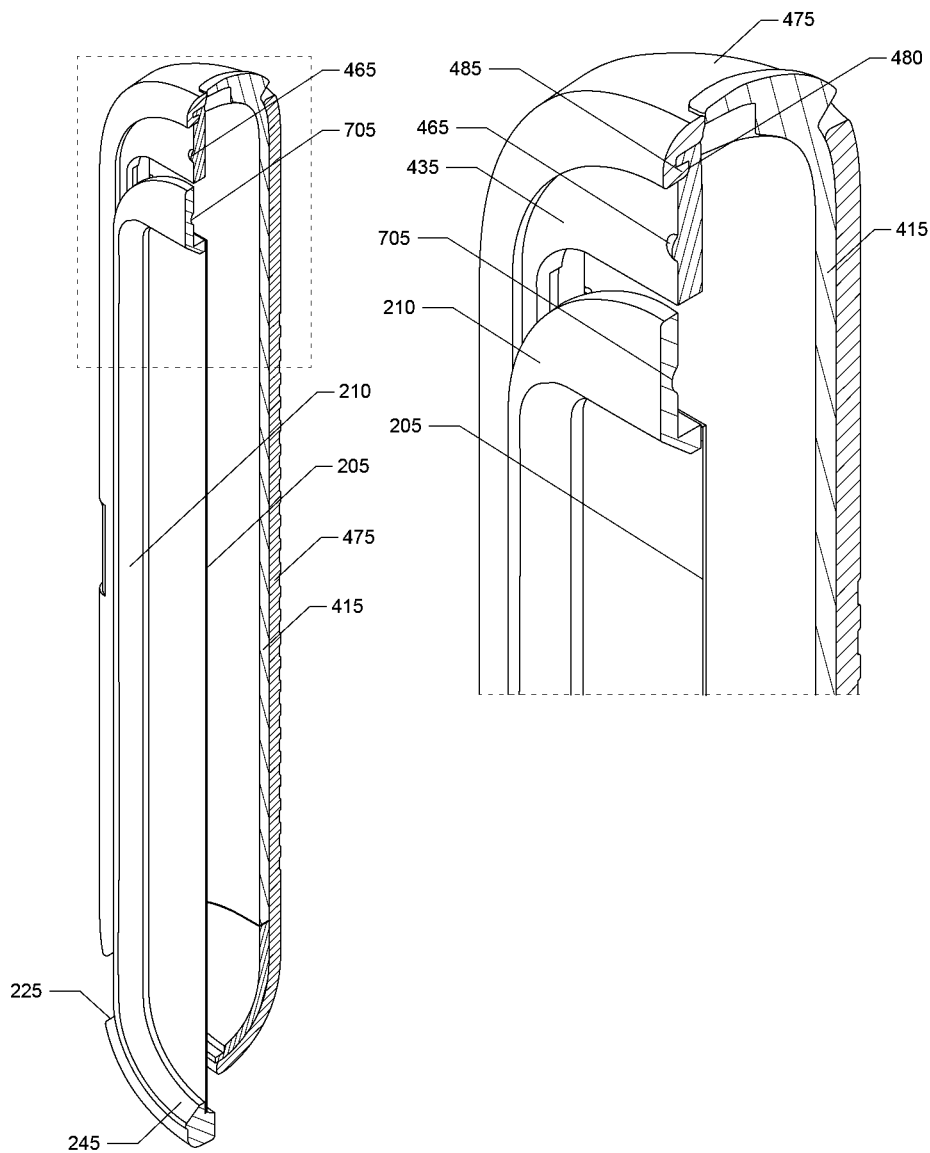
FIG. 8 is a cross-sectional view of a protective case with a removable screen protector for an electronic device and an enlarged view of a portion thereof.

The cushion layer 475 can be configured to fit over at least a portion of the outer surface of the hard shell 405, as shown in FIGS. 4 and 8. The cushion layer 475 can protect the electronic device from drop-induced damage. For instance, the cushion cover 475 can absorb or dissipate impact forces resulting from the protective case 100 being dropped onto a hard surface. To improve appearance and performance, the protective cover can include one or more retention features to keep the cushion layer 475 affixed to the hard shell 405 during use. In one example, the first hard shell 410 can include a trough 480 extending around the perimeter portion 435, as shown in FIG. 8. The trough 480 can be continuous or discontinuous and can be configured to receive a lip 485 extending from the cushion layer 475 as shown in FIG. 8. During installation, the user can install the cushion layer 475 over the hard shell 405 and can depress the lip 485 into the trough 480 by working a finger around the perimeter of the protective case 100 while applying a downward pressure against the cushion layer 475 proximate the lip 485 to urge the lip into the trough 480. In one example, the lip 485 can be slightly wider than the trough 480 to provide an interference fit. Due to the relatively softer material of the cushion layer 475 compared to the hard shell 405 material, the interference fit can cause the lip 485 to slightly compress upon insertion into the trough 480. Compression of the lip 485 during insertion into the trough 480 can produce resultant outward forces that, combined with the coefficient of friction of the cushion layer 475 material, can assist in retaining the lip 485 in the trough 480.

Figure 7:
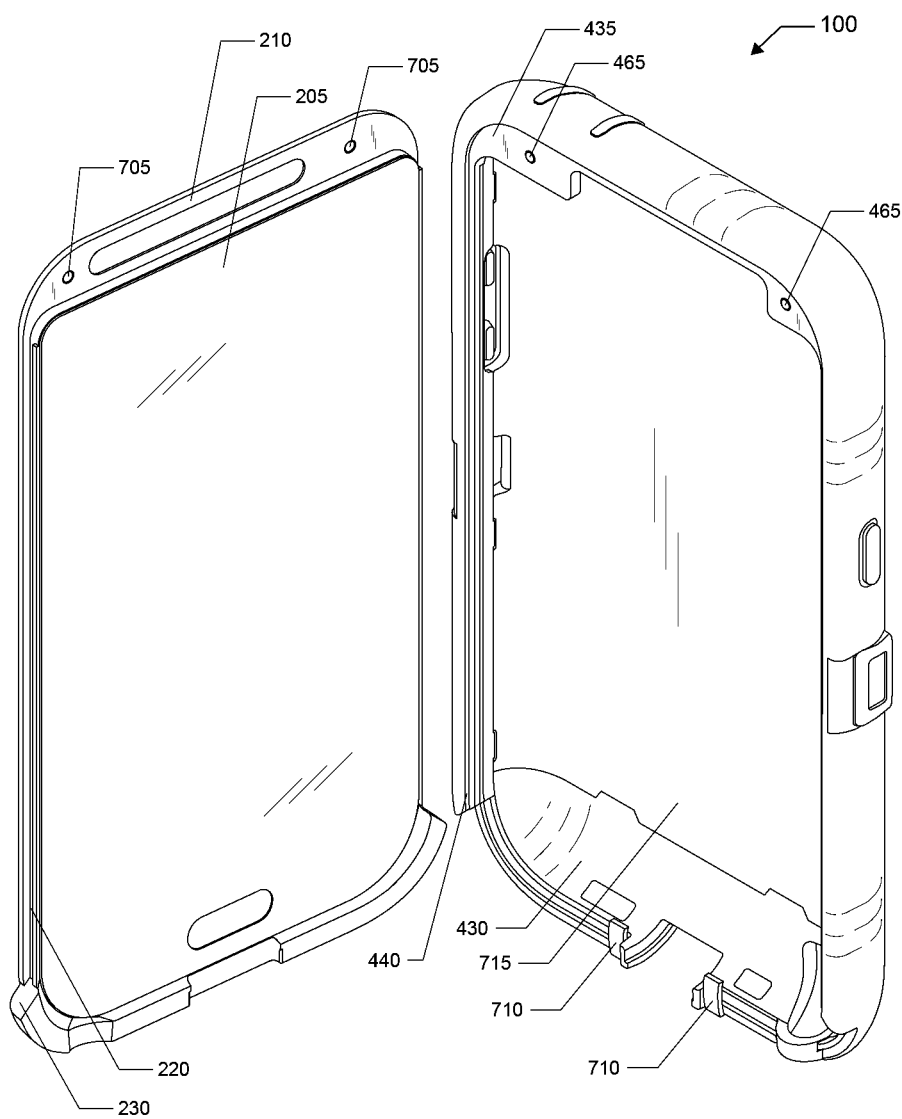
FIG. 7 is a front perspective view of a protective case for an electronic device with a removable screen protector uninstalled.

The protective case 100 can include one or more flexible fingers 710, as shown in FIG. 7, which can assist in retaining the electronic device in the protective case 100 when the removable screen protector 200 is not installed and when the protective case is overturned. This type of situation may be encountered when the user is exchanging the removable screen protector 200 and rotates the protective case 100 to a position where the front of the protective case is facing toward the ground. To ensure that the electronic device does not inadvertently fall out of the protective case 100 and become damaged, the protective case can include flexible fingers 710 that assist in retaining the electronic device within the protective case. These flexible fingers 710 can have any suitable size and shape and can be located at any suitable position around the perimeter of a cavity 715 configured to receive the electronic device, as shown in FIG. 7. In one example, the flexible fingers 710 can be located along a lower edge of the cushion layer 475, as shown in FIG. 7. In another example, the flexible fingers 710 can be located along a lower edge of the hard shell 405, such as along a lower edge of the front hard shell 410. The flexible fingers 710 can be made of a flexible material, such as a thermoplastic elastomer (TPE), that allows the flexible fingers to deflect during installation of the electronic device into the cavity 715 and then return to their original position after the electronic device has been installed into the cavity. Once the electronic device is installed in the cavity 715, the flexible fingers 710 can extend over a front perimeter edge of the electronic device and effectively capture the electronic device thereby allowing the protective case 100 to be overturned when the removable screen protector 200 is uninstalled without risk of the electronic device falling out of the cavity and onto the ground.

FIGS. 1-3 show three stages of installation of the removable screen protector 200. In FIG. 3, the removable screen protector 200 is completely uninstalled from the protective case 100. In FIG. 2, the removable screen protector 200 is partially slidably attached to the protective case 100, and the first and second rails receivers (440, 445) are partially engaged with the first and second rails (215, 220), respectively. In FIG. 3, the removable screen protector 200 is fully slidably attached to the protective case 100, and the first and second rails (215, 220) are fully engaged with the first and second rail receivers (440, 445), respectively, and the detents 465 are nested in the recesses 705, thereby resisting removal.

In one example, the frame 210 of the removable screen protector 200 can be made of a relatively light and stiff material, such as a polymer, metal, or organic material. Suitable materials include, but are not limited to, polycarbonate (PC), high impact polystyrene (HIPS), nylon, fiberglass-filled nylon, acrylonitrile butadiene styrene (ABS), polyoxymethylene (POM), polyethylene terephthalate (PET), aluminum, aluminum alloy, titanium, wood, carbon fiber, or any combination thereof. The frame 210 can include an opening 235, as shown in FIG. 4, which provides access to a display screen on a front surface of the electronic device when the device is installed in the protective case 100. The frame 210 can include one or more openings 240 to accommodate features of the electronic device, such as a speaker, microphone, or camera. The frame 210 can include a base surface 245 that allows the user to engage one or more fingertips, or fingertip portions, against the base surface, and by applying a force, uninstall the removable screen protector 200 from the protective case 100. The base surface 245 can include a texture, such as an orange peel texture, to provide additional friction against the user's fingertips thereby easing removal of the removable screen protector 200.

Figure 9:
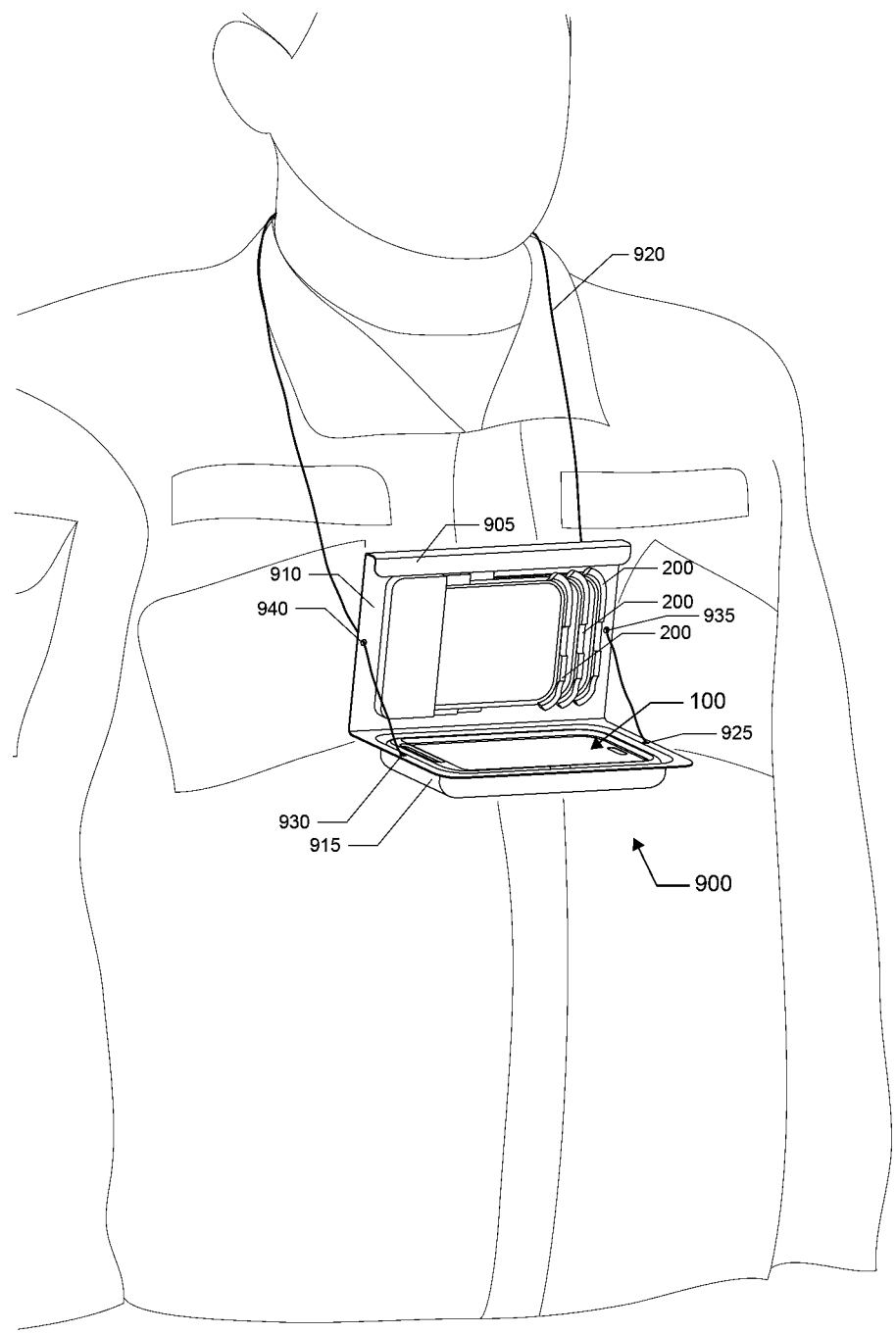
FIG. 9 is a front view of a wearable storage container in an open position including a protective case for an electronic device and a plurality of removable screen protectors.
Figure 13:
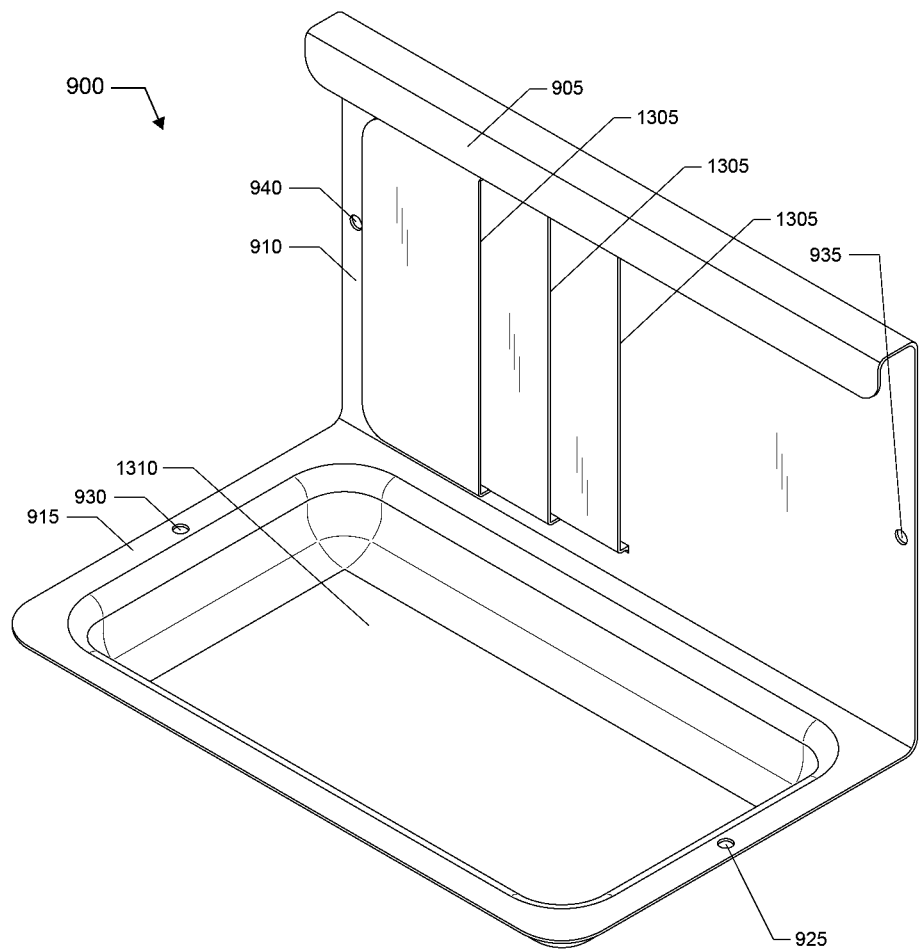
FIG. 13 is a front perspective view of an empty wearable storage container in an open position.

The removable screen protector 200 can serve one or more functions including, but not limited to, display screen protection, display screen amplification, night vision compatibility, providing a mirrored surface, heat shielding, anti-reflection, and power generation. In one example, the protective case can include several removable screen protectors 200 that together form a kit that provides a variety of functionality. In one embodiment, the kit can include a plurality of removable screen protectors 200, and those removable screen protectors can be stored in a container, such as a wearable storage container 900, as shown in FIG. 9. The wearable storage container 900 can include one or more slots 1305 on an inner surface of the storage container, as shown in FIG. 13. The slots 1305 can be configured to receive at least one removable screen protector 200.

The removable screen protectors 200 can each have a special attribute that allows the user to quickly and easily modify the attributes of the protective case 100 by exchanging a first removable screen protector for a second removable screen protector. In this way, the user can quickly and easily modify the attributes of the protective case 100 to better align with practical considerations of the user's environment. In one example, a soldier can modify the protective case 100 when transitioning from a noncombat zone to a combat zone. In another example, a civilian can modify the protective case when moving from a private space to a public space or from indoors to outdoors.

Figure 10:
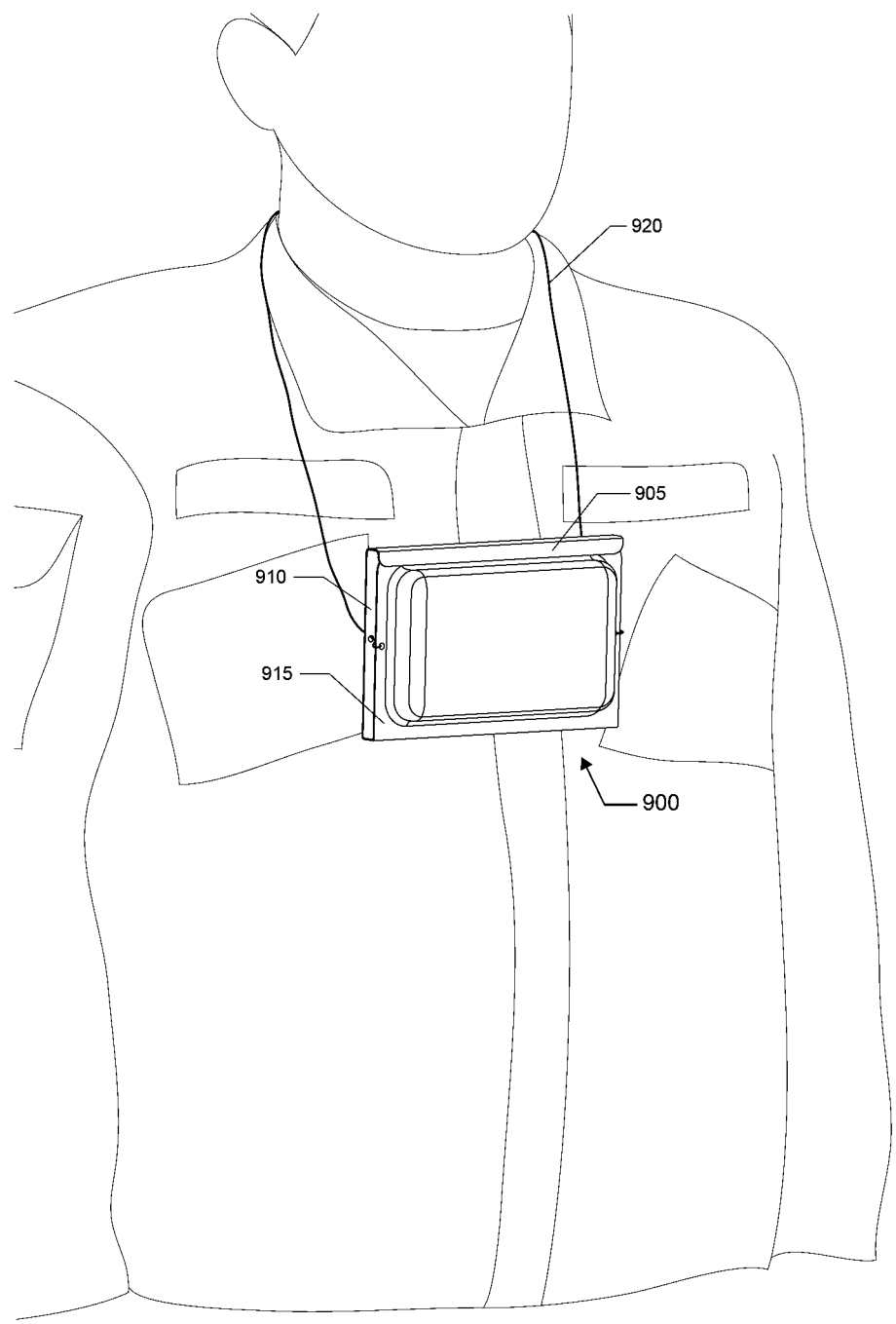
FIG. 10 is a front perspective view of a wearable storage container in a closed position.
Figure 11:
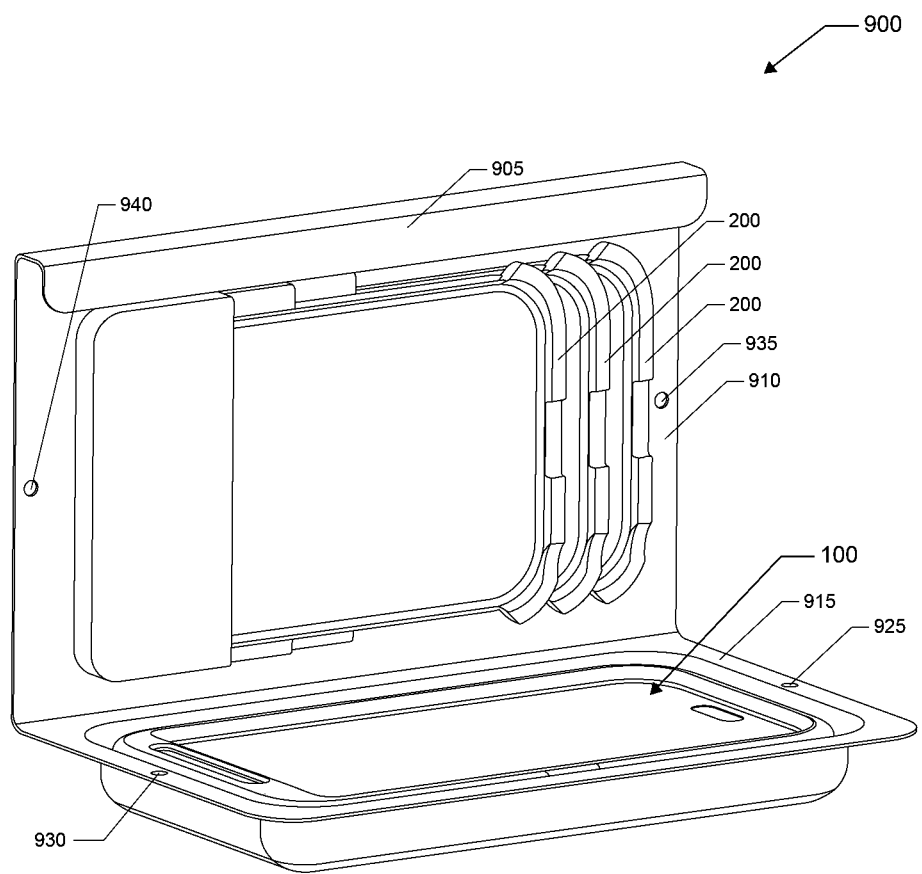
FIG. 11 is a front perspective view of a wearable storage container in an open position including a protective case for an electronic device and a plurality of removable screen protectors.
Figure 12:
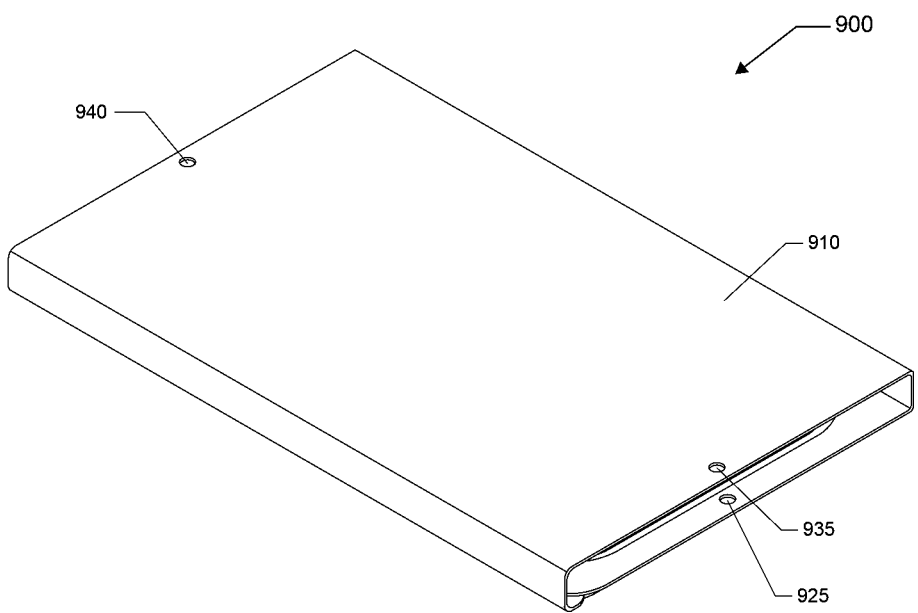
FIG. 12 is a rear perspective view of a wearable storage container in a closed position.
Figure 14:
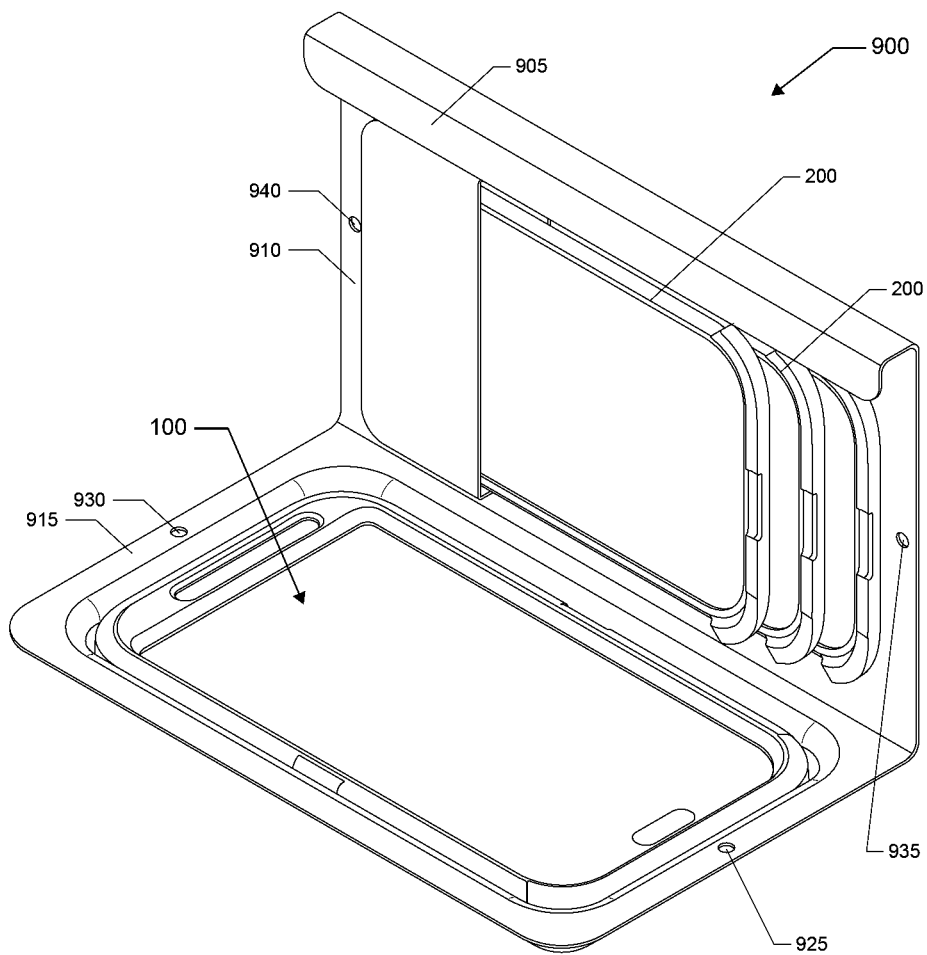
FIG. 14 is a front perspective view of a wearable storage container in an open position including a protective case for an electronic device and a plurality of removable screen protectors.

The wearable storage container 900 can be configured to receive and store one or more removable screen protectors 200, as shown in FIGS. 9, 11, and 14. Each of the plurality of removable screen protectors 200 can be configured to removably attach to the protective case 100 and to cover a display screen of an electronic device when the electronic device is placed in the protective case. The wearable storage container 900 can also include a cavity 1310, as shown in FIG. 13, configured to receive and store the electronic device when installed in the protective case 100. In one example, the wearable storage container 900 can include a strap 920 that allows the container to be worn around the user's neck, as shown in FIGS. 9 and 10. This configuration can position the wearable storage container 900 against the user's chest. During use, a bottom portion 915 of the wearable storage container that cradles the protective case 100 can be rotated from a substantially vertical orientation as shown in FIG. 10 (i.e. closed position) to a substantially horizontal orientation shown in FIG. 9 (i.e. open position), thereby allowing the user to view the display screen of the electronic device housed in the protective case while also freeing the user's hands for other tasks.

The wearable storage container 900 can include any suitable mechanism for maintaining the container in a closed position. For example, the wearable storage container 900 can include a top portion 910 and a bottom portion 915 connected along an edge to form a clamshell container with a clasping mechanism affixed to either the top or bottom portion. As shown in FIG. 9, the clasping mechanism 905 can be affixed to the top portion 910 of the wearable storage container 900 and can be a VELCRO flap that engages a surface of the bottom portion 915. In another example, the wearable storage container can include a zipper, snap, buckle, magnet, or any other suitable clasping mechanism that permits the wearable storage container to remain in a closed position.

In one example, the strap 920 can be attached at a first attachment point 925 and a second attachment point 930 located on the bottom portion 915 of the wearable storage container 900. The strap 920 can be threaded through a first hole 935 and a second hole 940 located in the top portion 910 of the wearable storage container 900. Once opened, friction between the strap 920 and the first and second holes (935, 940) can be adequate to resist closing of the wearable storage container 900, thereby allowing the user to view the electronic device in the cavity 1310 without having to physically hold the storage container open, as shown in FIG. 9. This can be helpful if, for instance, the user is navigating based on a map displayed on the display screen of the electronic device and is carrying objects in both hands, such as ski or trekking poles.

A membrane 205 can be attached to the frame 210 of the removable screen protector 200 and can cover an opening 235 in the frame 210. When the removable screen protector 200 is fully installed on the protective case 100, the frame 210 can hold the membrane 205 proximate the display screen of the electronic device. The membrane 205 can be made of any suitable material that permits the user to interact with the display screen of the electronic device through the membrane and opening 235 in the frame 210. In one example, the membrane 205 can be made from a flexible, plastic layer such as a thin layer of polycarbonate (e.g. LEXAN), polyvinylchloride, high-strength alkali-aluminosilicate thin sheet glass (e.g. GORILLA GLASS), urethane, silicon, or any other suitable material. The membrane 205 can be formed using any suitable manufacturing process, such as thermoforming, casting, stretching, heating, or injection molding. In one example, the membrane 205 can include a thin, transparent, flexible layer of polyurethane, which can serve as a clear screen protector. The membrane 205 can have any suitable thickness. In one example, the membrane 205 can have a thickness of about 0.001-0.100, 0.001-0.050, 0.004-0.020, 0.005-0.015, or 0.005-0.010 inches.

The membrane 205 can be attached to the frame 210 by any suitable attachment method. For instance, the membrane 205 can be attached to the frame 210 by laser transmission welding, form-in-place adhesive, or ultrasonic welding. In another example, the membrane 205 can be attached to the frame 210 with a thin layer of pressure sensitive adhesive (PSA). The thin layer of PSA can be applied to a front surface of the membrane 205 around the perimeter of the membrane. The membrane 205 can then be attached to the frame 210 by pressing the front surface of the membrane against a back surface of the frame proximate the opening 235 in the frame. In this example, the frame 210 can cover and conceal the layer of PSA to provide a clean appearance when viewed from a front side of the removable screen protector.

In another example, the membrane 205 and the frame 210 can be a single component formed from one material in a single manufacturing process. Alternately, the membrane 205 and the frame 210 can be a single component formed from two or more materials during one or more manufacturing processes.

The membrane 205 can include one or more openings 250 to permit use of one or more features of the electronic device, such as a microphone, speaker, camera, or button located on the front surface of the electronic device. In one example, the opening 250 can be large enough to provide access to two or more features on the front surface of the electronic device. If positioned over a microphone on a front surface of the electronic device, the opening 250 can provide sufficient clearance around the microphone to avoid inducing echoes into an audio signal received by the microphone.

In one example, it can be desirable for the membrane 205 to be night vision compatible, thereby allowing the electronic device within the protective case 100 to be used with a night vision imaging system, such as night vision goggles. Certain night vision imaging systems work by converting photons into electrons which are then directed at a phosphor screen on which an image is illuminated. Night vision systems are capable of making it possible to see in very low light environments. In most instances, the systems can amplify the brightness of a night scene by up to 2,000 times. To protect an image intensifier, the system can include an automatic gain control (AGC) which can aperture down the system when exposed to bright light in the range of about 600-930 nm. For example, if a soldier is wearing night vision goggles and attempts to use an electronic device without a night vision compatible membrane, the light emitted from the display screen of the electronic device will cause the AGC to activate, which will cause the goggles to become proportionally less sensitive to nighttime objects. As a result, the night vision goggles will become less effective at allowing the soldier to identify nighttime objects and risks around them. Moreover, light emitted by the electronic device can make the soldier more visible to enemies, thereby further compromising the soldier's safety.

Figure 15:
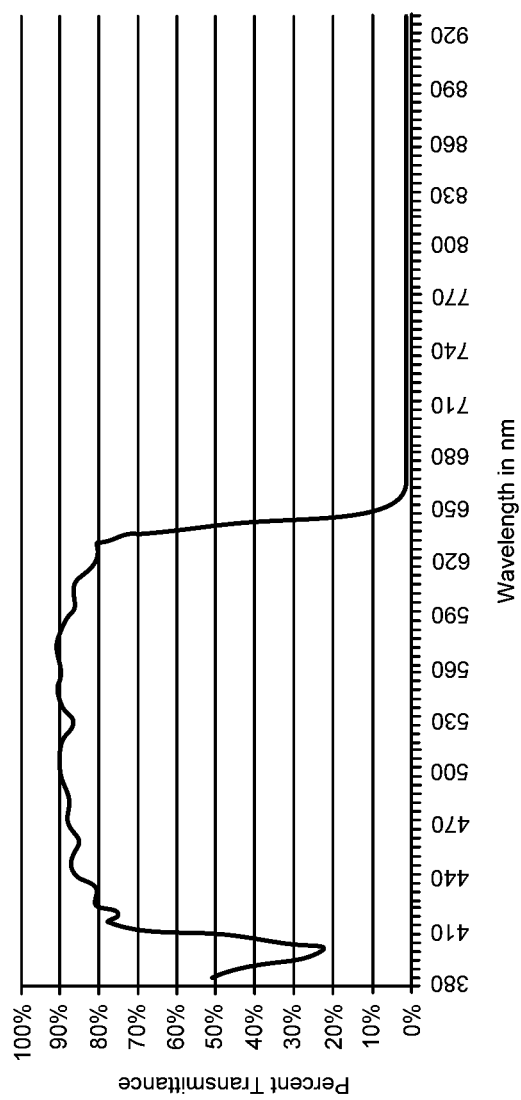
FIG. 15 is an example plot of transmittance versus wavelength for a night vision compatible membrane.

There are many scenarios where it can be desirable for the removable screen protector 200 to be night vision compatible, including the scenario described above. The night vision compatible screen protector 200 can include a membrane 205 that filters wavelengths having a range of about 380-600, 600-900, or 600-930 nm. The membrane 205 can have a transmittance of IR radiation less than about 15%, 10%, 5%, or 1%, where transmittance is defined as the fraction of incident light at a specified wavelength that passes through a sample. In one example, the membrane 205 can have an IR transmittance of less than about 1% for wavelengths of about 600-930 nm. In another example, the membrane 205 can have an IR transmittance of less than about 1% for wavelengths of about 665-930 nm. In yet another example, the membrane 205 can have an IR transmittance of less than about 5% for wavelengths of about 665-930 nm. FIG. 15 shows transmittance versus wavelength for an example night vision compatible membrane 205 where transmittance for wavelengths between about 665 and 930 nm is less than about 1% and where transmittance for wavelengths between about 425 and 630 is greater than about 75%.

The task of filtering light emitted from the display screen can be accomplished, for example, by using a membrane 205 that includes IR absorbing glass or thermoplastics, or thin film coatings that simultaneously reflect IR radiation and allow visible light to pass. The membrane 205 can absorb or reflect IR radiation and can be made of, for example, plastic, glass, or any combination thereof. By significantly reducing the amount of IR radiation that passes through the membrane 205 from the display screen, the user can safely interact with the display screen without impairing the nighttime sensitivity of the night vision imaging system.

Under certain circumstances, electromagnetic waves generated by the electronic device can negatively affect the night vision imaging system. These affects are known as Electromagnetic Interference (EMI) and Radio Frequency Interference (RFI) and can cause malfunctions in the night vision imaging system. To avoid malfunctions, a layer of EMI/RFI shielding can be applied to the membrane 205. In one example, the EMI/RFI shielding can be applied to the membrane 205 as a spray. The spray can be acrylic based and can include one or more metals such as nickel, silver, or copper to prevent EMI and RFI from passing through the membrane. In other examples, the layer of EMI/RFI shielding can be applied as a brushed-on coating. In medical environments, the layer of EMI/RFI shielding can be useful in meeting standards set by the U.S. Food and Drug Administration by preventing the electronic device housed in the protective case 100 from interfering with the operation of medical equipment in a hospital.

The membrane 205 can include an anti-reflective coating. The anti-reflective (AR) coating can be a type of optical coating applied to the surface of membrane to reduce reflection. The AR coating can improve the efficiency of the membrane, since less light is lost through reflection. The AR coating can reduce glint from the membrane 205, which could compromise a covert location of a soldier using the protective case 100. In one example, the AR coating can include a transparent thin film having a plurality of alternating layers with contrasting refractive indexes. The thickness of each layer can be chosen to produce destructive interference in the beams of light reflected from the interfaces between adjacent layers, and constructive interference in the corresponding transmitted beams of light. Performance of the AR coating can change depending on wavelength and incident angle of incoming light. The AR coating can be selected to perform across a wide range of wavelength ranges, including infrared, visible, and ultraviolet ranges.

U.S. military specification MIL-STD-3009, published on Feb. 2, 2001, specifies the interface and performance requirements for certain display equipment intended to be used along with night vision imaging systems and is hereby incorporated by reference. The membrane 205 can be compatible with U.S. military specification MIL-STD-3009. The membrane 205 can be compatible with Class A, Class B, or Class C night vision imaging systems.

In one example, the membrane 205 can include a privacy filter. The privacy filter can include microlouvers that permit viewing of the touchscreen display by a user who is directly in front of the display, but restrict viewing of the display by a second individual who is not directly in front of the display, such as a person standing beside the user. In this way, the privacy filter can allow the user to prevent confidential information from being viewed by the second individual.

In another example, it can be desirable for the membrane 205 to provide heat shielding to the electronic device housed inside the protective case 100. In certain environments, such as desert environments, heat shielding can be useful in preventing the temperature of the electronic device's circuitry or battery from exceeding a maximum safe operating temperature. Heat shielding can also reduce thermal loading on the display screen of the electronic device. To provide heat shielding, the membrane 205 can include a surface coating that reflects visible sunlight, ultraviolet radiation, or infrared radiation. In one example, the membrane 205 can include a metallic coating providing a highly reflective surface made of aluminum, gold, silver, or other suitable material. In addition to providing heat shielding, the membrane 205 with a reflective surface can also serve as a mirror, thereby providing additional functionality.

In yet another example, the removable screen protector 200 can be configured to generate electrical current from solar radiation. The removable screen protector 200 can include a photovoltaic (PV) system configured to convert solar radiation into electrical current that can be used to power the electronic device or can be stored in a battery in the electronic device or within a second battery located in the protective case 100 or in the wearable storage container 900. The removable screen protector 200 can include any suitable type of PV system having any suitable type of solar cells, such as thin film cells, multi junction cells, single junction cells, crystalline-silicon (c-Si) cells, inorganic cells, or organic cells.

The protective case 100 described herein can be useful in healthcare applications. Medical professionals often rely on personal electronic devices, such as smartphones and tablet computer, to access electronic patient records. These devices must be contained in protective cases that can be sterilized repeatedly. In some instances, frequent sterilization throughout the workday may be required. Consequently, the speed at which the electronic device can be removed from the protective case 100 to permit sterilization of the case is important. The electronic device can be quickly and easily removed from the protective case 100 described herein by slidably uninstalling the removable screen protector 200 and withdrawing the electronic device from the cavity 715 of the case. The protective case can then be sterilized using any suitable method.

In some situations, it may be desirable to attach two or more removable screen protectors to the protective case. For example, it may be desirable to use a first screen protector with an AR coating over a second screen protector that is night vision compatible. To accommodate two screen protectors, the protective case 100 can include two rail systems, as described herein, that allow two removable screen protectors 200 to slidably attach to the protective case. To accommodate more than two screen protectors, the protective case 100 can include more than two rail systems that allow more than two removable screen protectors 200 to slidably attach to the protective case 100.

The electronic device can be installed in the protective case 100 through a series of steps. First, the bottom portion of the electronic device can be inserted into the cavity 430 in the first hard shell 410. Second, the second hard shell 415 can be attached to the first hard shell 410 by engaging a plurality of perimeter tabs 450 on the first hard shell 410 with a plurality of tab engagement features 455 on the second hard shell 415. During this step, the user may hear an audible snap as each of the perimeter tabs 450 snaps into a respective tab engagement feature 455, and this audible feedback can assure the user that the hard shell 405 has been properly assembled. Third, the cushion layer 475 can be installed over the assembled hard shell 405 containing the electronic device. Fourth, the removable screen protector 200 can be slidably attached to the first hard shell 410 to cover the front surface of the electronic device. In another example, the order of the third and fourth steps can be reversed.

In one example, a protective case for an electronic device can include a removable screen protector having a frame with an opening that is configured to align with a display screen of the electronic device when the electronic device is installed in the protective case. The removable screen protector can include a membrane attached to the frame and covering the opening in the frame, and the frame can be slidably attachable to a front side of the protective case, and the membrane can substantially parallel to the display screen of the electronic device when the electronic device is installed in the protective case and when the removable screen is slidably attached to the protective case.

In one configuration, the protective case can include a first rail receiver and a second rail receiver, and the first rail receiver can be configured to receive a first rail disposed along a first edge of the removable screen protector, and the second rail receiver can be configured to receive a second rail disposed along a second edge of the removable screen protector when the removable screen protector is slidably attached to the protective case. In an alternate configuration, the protective case can include a first rail and a second rail, and the first rail can be configured to receive a first rail receiver disposed along a first edge of the removable screen protector, and the second rail can be configured to receive a second rail receiver disposed along a second edge of the removable screen protector when the removable screen protector is slidably attached to the protective case.

The protective case can include a hard shell case configured to receive and house the electronic device. The hard shell case can include a first hard shell that attaches to a second hard shell to form the hard shell case, and the first hard shell can be configured to contact at least a portion of a front surface of the electronic device when the electronic device is installed in the protective case, and the second hard shell can be configured to contact at least a portion of a back surface of the electronic device when the electronic device is installed in the protective case. In one example, the first rail and the second rail can be integrated into the first hard shell of the hard shell case.

In one instance, the membrane can include a privacy filter. In another instance, the membrane can be night vision compatible, and the night vision compatible membrane can have a transmittance of less than 5% for wavelengths between about 665-930 nm.

The protective case can include a cushion layer that surrounds the hard shell case and attaches to the first hard shell. The cushion layer can include a front opening and a lip protruding from an inner surface of the cushion layer near a perimeter of the front opening. The lip can protrude inward toward an inner volume of the cushion layer and the first hard shell can include a trough configured to receive the lip to permit attachment of the cushion layer to the first hard shell.

The protective case can include one or more flexible fingers located along a lower edge of the cushion layer, and the flexible fingers can be configured to prevent the electronic device from falling out of the protective case when the removable screen protector is not installed.

A removable screen protector kit for an electronic device can include a wearable storage container, a protective case for the electronic device, and a plurality of removable screen protectors configured to removably attach to the protective case and to cover a display screen of the electronic device when the electronic device is installed in the protective case. The protective case can be configured to a fit in the wearable storage container. Each removable screen protector can include a frame and a membrane attached to the frame and covering an opening in the frame, where the frame is slidably attachable to a front side of the protective case, and where the membrane is substantially parallel to a display screen of an electronic device when the screen protector is slidably attached to the protective case and when the electronic device is installed in the protective case.

The removable screen protector kit can include a plurality of slots disposed in the wearable storage container, where each of the plurality of slots is configured to receive at least one of the screen protectors. The plurality of removable screen protectors can include at least one removable screen protector having a membrane that is a clear screen protector. The plurality of removable screen protectors can include at least one removable screen protector having a membrane that is night vision compatible. The night vision compatible membrane can have a transmittance of less than 5% for wavelengths between about 665-930 nm.

A removable screen protector for a protective case can include a frame and a membrane. The frame can be configured to slidably attach to the protective case by way of a rail system, and the membrane can attach to the frame and cover an opening in the frame, where the membrane is substantially parallel to a display screen of the electronic device when the removable screen protector is slidably attached to the protective case by way of the rail system and when the electronic device is installed in the protective case. The membrane can be night vision compatible and can have a transmittance of less than 5% for wavelengths between about 665-930 nm.

In one example, the rail system can include a first rail receiver disposed along a first edge of the frame and a second rail receiver disposed along a second edge of the frame, where the first rail receiver is configured to engage a first rail disposed along a first edge of the protective case, and where the second rail receiver is configured to engage a second rail disposed along a second edge of the protective case when the removable screen protector is slidably attached to the protective case. In another example, the rail system can include a first rail disposed along a first edge of the frame and a second rail disposed along a second edge of the frame, where the first rail is configured to engage a first rail receiver disposed along a first edge of the protective case for the electronic device, and where the second rail is configured to engage a second rail receiver disposed along a second edge of the protective case for the electronic device when the removable screen protector is slidably attached to the protective case.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. A protective case for an electronic device, the case comprising:
   a rigid shell configured to cover at least a portion of the electronic device, the rigid shell comprising a first hard shell component and a second hard shell component, the first hard shell component having a plurality of perimeter tabs to engage respective tab engagement features on the second hard shell component to removably attach the first hard shell component to the second hard shell component, the rigid shell including a first engagement portion and one or more detents;
   a cushion layer configured to fit over at least a portion of an outer surface of the rigid shell, the cushion layer including one or more retention features for keeping the cushion layer affixed to the rigid shell;
   a rigid frame defining an opening that is configured to align with a display screen of the electronic device when the electronic device is installed in the protective case, the rigid frame having a second engagement portion integrally formed with the frame to slidably engage the first engagement portion of the rigid shell for attachment of the rigid frame to the rigid shell, the rigid frame including one or more retaining features for engaging the one or more detents of the rigid shell, respectively, for removably retaining the rigid frame in the rigid shell; and
   a membrane substantially permanently attached at least at a perimeter of the membrane to the rigid frame and covering the opening in the frame, wherein
   the rigid frame together with the attached membrane is slidably attachable at the second engagement portion to the first engagement portion of the rigid shell at a front side of the protective case, the rigid frame with attached membrane further being slidably detachable from the front side of the protective case, and the membrane is configured to be substantially parallel to the display screen of the electronic device when the electronic device is installed in the protective case and while the rigid frame is slidably attached.

2. The protective case of claim 1, wherein the first engagement portion includes
   a first rail receiver and a second rail receiver, and the second engagement portion includes a first rail and a second rail, wherein the first rail receiver is configured to receive the first rail, and wherein the second rail receiver is configured to receive the second rail when the rigid frame is slidably attached to the protective case.

3. The protective case of claim 1, wherein the first engagement portion includes
   a first rail and a second rail, and the second engagement portion includes a first rail receiver and a second rail receiver, wherein the first rail is configured to receive the first rail receiver, and wherein the second rail is configured to receive the second rail receiver when the rigid frame is slidably attached to the protective case.

4. The protective case of claim 1, wherein the rigid shell is configured to receive and house the electronic device.

5. The protective case of claim 1, wherein the first hard shell component is configured to contact at least a portion of a front surface of the electronic device when the electronic device is installed in the protective case, and wherein the second hard shell component is configured to contact at least a portion of a back surface of the electronic device when the electronic device is installed in the protective case.

6. The protective case of claim 3, wherein the first rail and the second rail are integrated into the first hard shell component.

7. The protective case of claim 1, wherein the membrane has an infrared radiation transmittance below a threshold in order to be compatible with night vision equipment.

8. The protective case of claim 1, wherein the membrane has a transmittance of less than 5% for wavelengths between about 665-930 nm and a transmittance of greater than about 75% for wavelengths between about 425-630 nm.

9. The protective case of claim 1, wherein the membrane comprises a privacy filter.

10. The protective case of claim 1, wherein the cushion layer comprises a front opening and a lip protruding from an inner surface of the cushion layer near a perimeter of the front opening, wherein the lip protrudes inward toward an inner volume of the cushion layer, and wherein the first hard shell component comprises a trough configured to receive the lip to permit attachment of the cushion layer to the first hard shell component.

11. The protective case of claim 10, further comprising one or more flexible fingers located along a lower edge of the cushion layer, wherein the flexible fingers are configured to prevent the electronic device from falling out of the protective case when the rigid frame is not installed.

12. A removable screen protector for a protective case configured to receive an electronic device, the removable screen protector comprising:
   a rigid frame configured to slidably attach to the protective case by way of a rail system in part formed in the rigid frame, the rigid frame having one or more retaining features, each retaining feature for engaging and snapping into a respective detent of the protective case to removably retain the rigid frame to the protective case; and a membrane substantially permanently attached at least at a perimeter of the membrane to the rigid frame and covering an opening in the rigid frame,
wherein the membrane is configured to be substantially parallel to a display screen of the electronic device while the removable screen protector is slidably attached to the protective case by way of the rail system and when the electronic device is installed in the protective case.

13. The removable screen protector of claim 12, wherein the rail system comprises:
a first rail receiver disposed of the rigid frame and a second rail receiver disposed of the rigid frame, wherein the first rail receiver is configured to engage a first rail of the protective case, and wherein the second rail receiver is configured to engage a second rail of the protective case when the removable screen protector is slidably attached to the protective case.

14. The removable screen protector of claim 12, wherein the rail system comprises:
a first rail of the rigid frame and a second rail of the rigid frame, wherein the first rail is configured to engage a first rail receiver of the protective case for the electronic device, and wherein the second rail is configured to engage a second rail receiver of the protective case when the removable screen protector is slidably attached to the protective case.

15. The removable screen protector of claim 12, wherein the membrane is night vision compatible, being formed of material having a transmittance of less than 5% for wavelengths between about 665-930 nm and a transmittance of greater than about 75% for wavelengths between about 425-630 nm.

16. The protective case of claim 1 wherein each of the one or more detents of the rigid shell comprises a semi-spherical protrusion and each of the one or more retaining features of the rigid frame comprises a recess configured to receive one of the semi-spherical protrusions.

17. The protective case of claim 1 wherein the rigid frame includes at least two stops each positioned to seat against respective portions of the cushion layer when the rigid frame is attached to the hard shell component in order to provide visual feedback to a user indicating completion of the attachment.

18. The removable screen protector of claim 12 wherein each of the one or more retaining features of the rigid frame comprises a recess configured to receive a semi-spherical protrusion of the protective case.

19. The removable screen protector of claim 12 wherein the rigid frame includes at least two stops each positioned to seat against respective portions of the protective case when the rigid frame is attached to the protective case in order to provide visual feedback to a user indicating completion of the attachment of the rigid frame to the protective case.

* * * * *